2,609,582

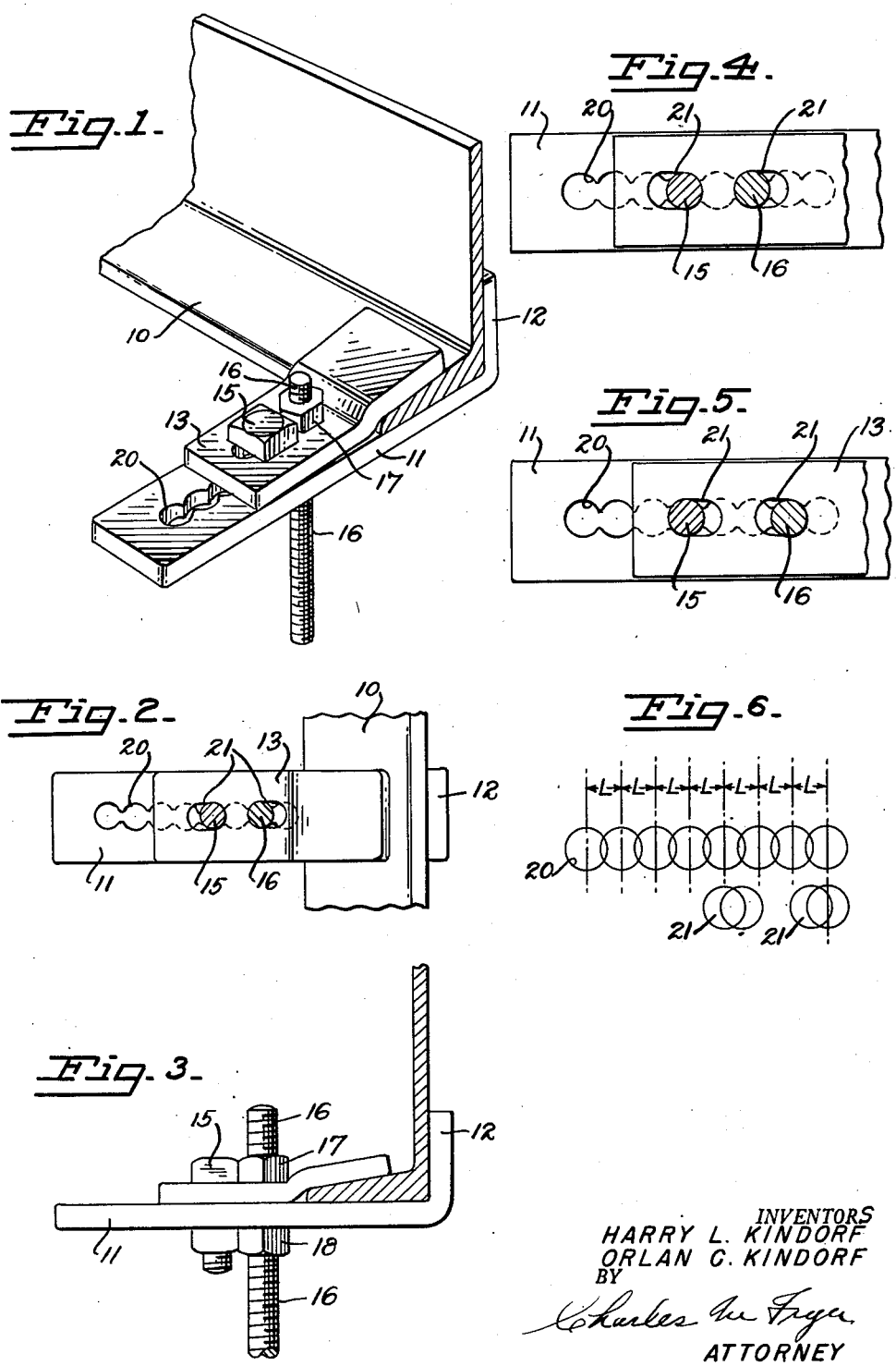
Sept. 9, 1952     H. L. KINDORF ET AL     2,609,582
ADJUSTABLE BEAM CLAMP
Filed Aug. 1, 1949
INVENTORS
HARRY L. KINDORF
ORLAN C. KINDORF
ATTORNEY Patented Sept. 9, 1952

UNITED STATES PATENT OFFICE 2,609,582

ADJUSTABLE BEAM CLAMP

Harry L. Kindorf and Orlan C. Kindorf, San Francisco, Calif., assignors to The Kindorf Co., San Francisco, Calif., a corporation of California Application August 1, 1949, Serial No. 107,993

3 Claims. (Cl. 24—243)

The present invention relates to adjustable beam clamps and particularly to a device to be clamped onto a structural beam to form a support for conduits, wires and other apparatus as is customary practice in ships, industrial buildings and the like.

The principal object of the invention is to provide a clamp of this kind that will securely engage a portion of a structural beam and be secured thereto by clamping bolts and that is adjustable with respect to beam sizes in increments less than the diameter of the bolts by which it is secured.

The following disclosure shows the clamp applied to the flange of a beam such as an angle or channel shape but it is as readily applicable to other shapes as will appear from the following description in which reference is made to the accompanying drawings.

In the drawings:

Fig. 1 is a perspective view of a beam clamp embodying the present invention shown in place on the flange of an angle.

Fig. 2 is a plan view with parts in section of the same clamp.

Fig. 3 is a view in elevation of the same clamp.

Fig. 4 is a fragmentary plan view illustrating the relationship of certain parts of the clamp in one position.

Fig. 5 is a view like Fig. 4 showing the same parts in different positions, and

Fig. 6 is a diagrammatic view illustrating the manner in which the holes are layed out in the clamp parts shown in Figs. 4 and 5.

Figs. 1 to 3, inclusive, of the drawings show the clamp of the present invention secured in place on the flange of an angle 10. The clamp comprises a body part 11 made of flat bar stock with an upturned end 12 engageable with one part of the angle. A clip 13 made of material similar to that of the body part 11 is shaped to overlie the flange of the angle 10 and to overlie a part of the body part 11. Both the part 11 and the clip 13 are perforated for the reception of bolts which extend through them for drawing them toward each other and for securely clamping between them the flange of the angle to prevent displacement of the clamp with respect to the angle. One of the securing bolts is shown at 15 as a conventional bolt and the other shown at 16 is preferably in the form of a long threaded rod with two nuts 17 and 18 thereon capable of being adjusted to draw the clamping parts together against the flange of the angle. The downwardly extending part of the rod 16 is adapted to carry other nuts, not shown, and any desired fitting for the support of pipes or conduits or other apparatus in a position adjacent the beam to which the clamp is secured.

As structural beams of the kind illustrated vary greatly in size, it is desirable that the clamp be adjustable to accommodate flanges of different dimensions. The bolts 15 and 16 which secure together the clamp parts must be fairly large in diameter to accommodate the loads sustained by the clamp and to impart the pressure required for clamping it to the beam. The required adjustment could be accomplished by the provision of an elongated slot in the clamp part 11 and two simple bolt holes in the clip 13. However, with such a structure, the clamping parts could slide longitudinally of each other if, due to vibration or other causes, the bolts should become loose.

The present invention provides adjustment of the separable clamp parts in increments smaller than the diameter of the bolts but with positive insurance against longitudinal sliding movement of the clamp parts. This is accomplished by providing an elongated slot 20 in the part 11 that is irregular in shape, being defined by a plurality of overlapping circles with their centers on a straight line. The clip 13 is provided with a pair of spaced holes 21, each produced in effect by two overlapping circles, the centers of all of the circles again being struck from a straight line. For example, Fig. 6 illustrates diagrammatically the manner in which the slot 20 and the holes 21 have been laid out and shows that the aligned overlapping circles forming the slot 20 are struck from centers spaced apart a distance L, this distance being slightly less than the diameter of the circles. The two circles which form each of the holes 21 in the part 13 are spaced apart one-half the distance L, the outermost circles of the two holes being three times L apart whereby these circles will register with the first and fourth circles in the group 20. The innermost circles which form the two holes 21 are spaced two L's apart for registry with the first and third circles in the slot 20 when the parts 11 and 13 are adjusted with relation to each other.

The effect obtained by this arrangement of holes and slots is that illustrated in Figs. 4 and 5 wherein adjustment of the clamp parts is shown to be possible in increments which are one-half the distance L or slightly less than half of the diameter of the bolts 15 and 16. For example, in Fig. 4 the bolt 16 is passed through the third circle or third position of the member 11 and the bolt 15 is passed through the fifth position. To adjust the clip 13 one-half space toward the flange of the angle 10, the bolts are removed and replaced with the bolt 16 occupying the second position in the member 11 and the bolt 15 again occupying the fifth position. The clip 13 now occupies a position one-half the distance L to the right of that shown in Fig. 4 though the bolts occupy the outer ends of the holes 21 rather than the inner ends. The next step to the right would be accomplished by moving the bolt 15 a full space into fourth position and moving the clip 13 a half space. Through similar procedure, a wide range of adjustment of very small increment is obtained. As the circles, which form the slots 20 and the holes 21, are the same diameter as the bolts, tolerances for ease of assembly being allowed, the bolts are held against sliding movement longitudinally of the clamp part 11 and the clip 13 is held against such movement with respect to the bolts in either the position shown in Fig. 4 or in Fig. 5. Consequently, relative movement of the parts 11 and 13 is prohibited in the event they tend to slip with relation to each other due to vibration or other causes.

For practical purposes the distance L of Fig. 6 may be the diameter of the bolts 15 and 16 and the circular openings are sufficiently larger than L to provide desirable clearance. In practice, therefore, the increments of adjustability would be measured as one half the bolt diameter.

We claim:

1. An adjustable beam clamp having separable parts engageable with opposite sides of a beam flange, bolts adapted to extend through said parts for clamping them to the flange, and both said parts having perforations to receive said bolts, the perforations on each part being formed in patterns of overlapping circles to provide a wide range of adjustability in small increments of the parts in their relative positions.

2. An adjustable beam clamp having an L-shaped part to engage and underly the flange of a beam with a portion extending beyond the edge of the flange, a clamping part overlying said portion and the beam flange, two bolts extending through the L-shaped part and clamping part to clamp the beam between them, and perforations in the L-shaped part and clamping part, said perforations in each part being formed in patterns of overlying circles to permit relative adjustment of said parts to accommodate beam flanges of different sizes in increments less than the diameter of the bolts.

3. In a beam clamp or the like, two relatively flat members and bolts extending through them to clamp them upon an object, one of said members having an elongated perforation formed in the pattern of a series of alined overlapping circles of a diameter to receive the bolts and the other member having two spaced elongated bolt perforations whereby the members may be adjusted longitudinally of each other in increments of less than the bolt diameter.

HARRY L. KINDORF.
ORLAN C. KINDORF.

REFERENCES CITED

The following references are of record in the file of this patent:

UNITED STATES PATENTS

| Number | Name | Date |
| --- | --- | --- |
| 1,020,238 | Weer et al. | Mar. 12, 1912 |
| 1,211,997 | Ahlander | Jan. 9, 1917 |
| 1,507,216 | Stockton | Sept. 2, 1924 |
| 2,460,470 | Rogers | Feb. 1, 1949 |